(12) United States Patent
Pan et al.

(10) Patent No.: US 8,655,108 B2
(45) Date of Patent: Feb. 18, 2014

(54) ADAPTIVE IMAGE UP-SCALING TECHNIQUE

(75) Inventors: Hao Pan, Camas, WA (US); Xinyu Xu, Tempe, AZ (US)

(73) Assignee: Sharp Laboratories of America, Inc., Camas, WA (US)

( * ) Notice: Subject to any disclaimer, the term of this patent is extended or adjusted under 35 U.S.C. 154(b) by 1585 days.

(21) Appl. No.: 11/999,072

(22) Filed: Dec. 3, 2007

(65) Prior Publication Data

US 2009/0074319 A1  Mar. 19, 2009

Related U.S. Application Data (60) Provisional application No. 60/994,547, filed on Sep. 19, 2007.

(51) Int. Cl.
*G06K 9/32* (2006.01)

(52) U.S. Cl.
USPC ........... 382/298; 382/299; 382/300; 345/667; 345/671

(58) Field of Classification Search
USPC ........................ 382/298–300; 345/667–671
See application file for complete search history.

(56) References Cited

U.S. PATENT DOCUMENTS

| | | | |
|---|---|---|---|
| 5,444,487 A | 8/1995 | Kondo et al. | |
| 5,485,557 A | 1/1996 | Sato et al. | |
| 5,517,588 A | 5/1996 | Kondo | |
| 5,579,445 A * | 11/1996 | Loce et al. | 358/1.2 |
| 5,666,164 A | 9/1997 | Kondo et al. | |
| 5,812,146 A | 9/1998 | Sato et al. | |
| 5,861,892 A | 1/1999 | Sato et al. | |
| 6,057,885 A | 5/2000 | Horishi et al. | |
| 6,323,905 B1 | 11/2001 | Kondo et al. | |
| 6,434,280 B1 | 8/2002 | Peleg et al. | |
| 6,466,702 B1 | 10/2002 | Atkins et al. | |
| 6,766,067 B2 | 7/2004 | Freeman et al. | |

(Continued)

FOREIGN PATENT DOCUMENTS

| | | |
|---|---|---|
| JP | 62-140179 | 6/1987 |
| JP | 3-027670 | 2/1991 |

(Continued)

OTHER PUBLICATIONS

A. J. Katz et al, Generating Image Filters for Target Recognition by Genetic Learning, IEEE 1994.*

(Continued)

*Primary Examiner* — Chan S Park
*Assistant Examiner* — Mark Roz
(74) *Attorney, Agent, or Firm* — Chernoff Vilhauer McClung & Stenzel, LLP (57) ABSTRACT

A method for scaling an image includes providing a set of filters based upon a low-resolution data set and a high-resolution data set suitable for up-scaling a low resolution image to a high resolution image. The filters are collectively representative of at least a portion of an image space and a substantial number of the filters are representative of a different at least one selected from a volume and a shape within the image space. A low-resolution image is received and generates a corresponding high-resolution image based up the filters.

2 Claims, 10 Drawing Sheets

(a) The HR windows consisting of four pixels do not overlap.
(b) The HR windows consisting of nine pixels overlap.

(56) References Cited

U.S. PATENT DOCUMENTS

| | | |
|---|---|---|
| 7,106,914 B2 | 9/2006 | Tipping et al. |
| 7,215,831 B2 | 5/2007 | Altunbasak et al. |
| 7,218,796 B2 | 5/2007 | Bishop et al. |
| 7,239,428 B2 | 7/2007 | Solecki |
| 2006/0146198 A1 | 7/2006 | Kondo et al. |
| 2006/0290950 A1 | 12/2006 | Platt et al. |

FOREIGN PATENT DOCUMENTS

| | | |
|---|---|---|
| JP | 4-129284 | 4/1992 |
| JP | 5-328185 | 12/1993 |
| JP | 10-093929 | 4/1998 |
| JP | 11-514810 | 12/1999 |
| JP | 2002-024815 | 1/2002 |
| JP | 2003-174557 | 6/2003 |
| JP | 2004-266381 | 9/2004 |
| WO | WO 03/102868 | 12/2003 |

OTHER PUBLICATIONS

International Search Report dated Oct. 28, 2008 issued by the Japanese Patent Office for PCT/JP2008/066906 as filed claiming priority based on U.S. Appl. No. 11/999,072, filed Dec. 3, 2007, 7 pages.

William Equitz; Fast Algorithms for Vector Quantization Picture Coding; Information Systems Laboratory—Stanford University; downloaded from IEEE Xplore; May 25, 2009; pp. 1-4.

William H. Equitz; A New Vector Quantization Clustering Algorithm; IEEE Transactions on Acoustics, Speech, and Signal Processing vol. 37 No. 10; Oct. 1989; pp. 1-8.

Frank M. Candocia & Jose C. Principe, "A Neural Implementation of Interpolation with a Family of Kernels," Proc. of the International Conference on Neural Networks, 1997, (ICNN 97), vol. III, pp. 1506-1511.

Frank M. Candocia & Jose C. Principe, "Superresolution of Images Based on Local Correlations," IEEE Transactions on Neural Networks, vol. 10, No. 2, pp. 372-380, Mar. 1999.

* cited by examiner (a) The HR windows consisting of four pixels do not overlap.
(b) The HR windows consisting of nine pixels overlap.

FIG. 1

Linear regression with the linear model

Segmented linear regression

Binary CART for classification of samples

FIG. 5

Multi-way CART for classification of samples

The relative position between the LR pixel grid and HR pixel grid.

The block-diagram of the training phase

FIG. 10

The block-diagram of updating the weights by breakpoints.

FIG. 11

The block-diagram of updating the breakpoints by weights.

FIG. 12

Updating the breakpoint

FIG. 15

ADAPTIVE IMAGE UP-SCALING TECHNIQUE

CROSS-REFERENCE TO RELATED APPLICATIONS

This application claims the benefit of U.S. Provisional App. No. 60/994,547, filed Sep. 19, 2007.

BACKGROUND OF THE INVENTION

The application claims the benefit of 60/994,547 filed Sep. 19, 2007.

High definition televisions (HDTVs) include image up-conversion techniques to properly display standard definition video content on the high definition television at a high definition resolution. Traditional spatial up-conversion techniques include linear interpolation such as bilinear/bi-cubic interpolation. Unfortunately, the linear techniques increases the number of pixels, but not the high frequency part of the spectrum, and therefore does not increase the perceived sharpness of the image.

To increase the perceived sharpness in the up-converted image, training-based content-adaptive techniques have been used. This type of training-based content-adaptive interpolation techniques has two phases: the training phase and the interpolation phase. The training phase is done offline by using a number of low-resolution (LR) images and their high-resolution (HR) counterparts as training data to define relationships between the LR images and the HR images. In the training phase, different sets of linear filter coefficients are derived from the training data for different local contents. The interpolation phase is done on-line by interpolating LR images not in the training data. In the interpolation phase, a set of the linear filter coefficients for a particular position in the LR image is chosen to interpolate HR pixels around that positions based on the local content. Although locally the interpolation is based on linear filtering, but because of the content adaptation of the linear filter coefficients, globally this type of the technique is non-linear.

The foregoing and other objectives, features, and advantages of the invention will be more readily understood upon consideration of the following detailed description of the invention, taken in conjunction with the accompanying drawings.

DETAILED DESCRIPTION OF PREFERRED EMBODIMENT

An image up-scaling technique suitable for standard definition television images to high definition images preferably up-scales the image by a factor of 2 on each of its two orthogonal dimensions. It is to be understood that the techniques described herein can be used for any up-scaling factor, such as 2.2, 4, or 10. The input image is referred to as the LR (low resolution) image, and the output up-scaled image is referred to as the HR (high resolution) image. The upscaling factor is preferably 2, so the HR image has four times as many pixels as the LR image. For example, if the input LR image has a resolution of 300×200 (a matrix of 300 columns and 200 rows), then the image up-scaling technique outputs the up-scaled HR image with the resolution of 600×400 (a matrix of 600 columns and 400 rows).

Figure 1:
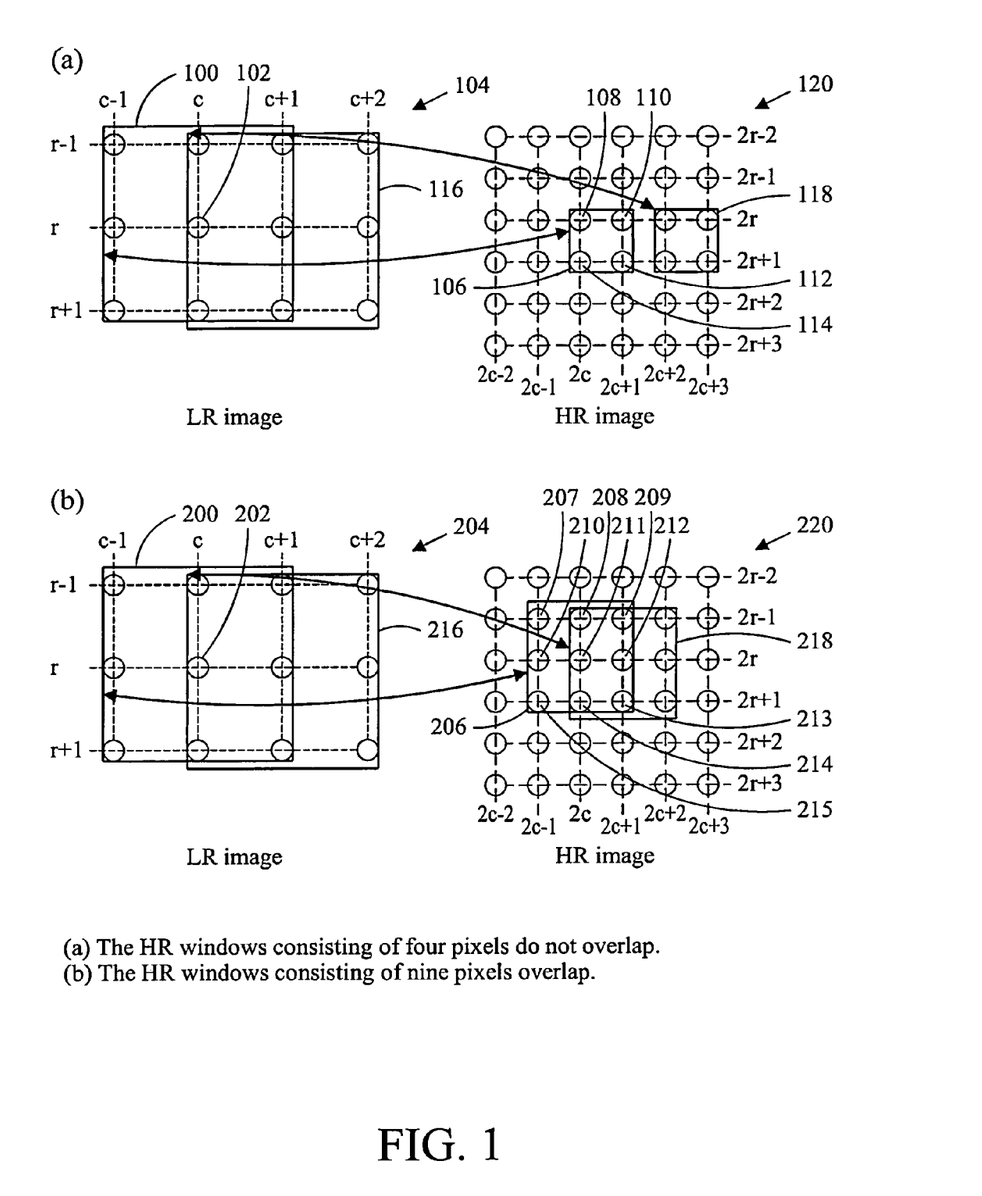
FIG. 1 illustrates the relationship between low resolution and high resolution images.

Referring to FIG. 1(a), the image up-scaling technique may be "window" based that defines windows on both input LR and output up-scaled HR images. The "widow" may be any set of continuous or discontinuous pixels. A LR window 100 is defined that is centered at pixel position (c, r) 102 of a LR image 104. The image upscaling technique generates either four or nine HR pixels (HR window 106) from the LR window 100 centered at or close to pixel position (2c, 2r) 108 in the HR image 120. The HR pixels 108, 110, 112, 114 form the HR window 106.

The image up-scaling technique moves the LR window 100 sequentially centered at every pixel of the input LR image 104, and each LR window generates a corresponding HR window. For example LR window 116 results in corresponding HR pixels 118. The nearby LR windows typically overlap to a greater or lesser extent, while the nearby HR windows may or may not overlap depending upon the number of pixels generated from a LR window. If each LR window generates four HR pixels, then the HR windows will typically not overlap, however, if each LR window generates nine pixels, then the HR windows will generally overlap. As illustrated in FIG. 1(a), four HR pixels are generated from one LR window and they form a HR window. It is also noted that the HR windows do not overlap.

Referring to FIG. 1(b), the image up-scaling technique may be "window" based that defines windows on both input LR and output up-scaled HR images. The "widow" may be any set of continuous or discontinuous pixels. A LR window 200 is defined that is centered at pixel position (c, r) 202 of a LR image 204. The image upscaling technique generates either nine HR pixels (HR window 206) from the LR window 200 centered at or close to pixel position (2c, 2r) 208 in the HR image 220. The HR pixels 207, 208, 209, 210, 211, 212, 213, 214, 215 form the HR window 206.

The image up-scaling technique moves the LR window 200 sequentially centered at every pixel of the input LR image 204, and each LR window generates a corresponding HR window. For example LR window 216 results in corresponding HR pixels 218. The nearby LR windows typically overlap to a greater or lesser extent, while the nearby HR windows may or may not overlap depending upon the number of pixels generated from a LR window. If each LR window generates four HR pixels, then the HR windows will typically not overlap, however, if each LR window generates nine pixels, then the HR windows will generally overlap. In FIG. 1(b), nine HR pixels are generated from one LR window and they form a HR window. In is also noted that the HR windows do overlap.

The image up-scaling technique includes a training phase which generates the HR pixels from a LR window that is learned from a number of LR images and their corresponding HR versions (the training set). Typically, a set of HR images are selected from which are generated LR versions, which are then used for the training phase. Then in the interpolation phase, the image up-scaling technique uses learned knowledge to generate new HR images based upon the input LR images.

The image up-scaling technique may treat the training as a regression analysis problem that builds a mathematical model f(X), from the M training samples to minimize the following mean square error:

$$E = \frac{1}{M} \sum_{i=1}^{M} (f(X_i) - Y_i)^2 \quad (1)$$

where $X_i=[x_{1,i} x_{2,i} \ldots x_{m,i}]^T$ and $Y_i=[y_{1,i} y_{2,i} \ldots y_{n,i}]^T$, i=1, 2 ... M, are the pixels in a LR and HR window in the training data, respectively. By the terminology of regression analysis, $X_i$ is a predictor variable vector in a m-dimensional predictor space, and $Y_i$ is a dependent variable vector in a n-dimensional dependent space. It is to be understood that other analysis techniques, may likewise be used.

Figure 2:
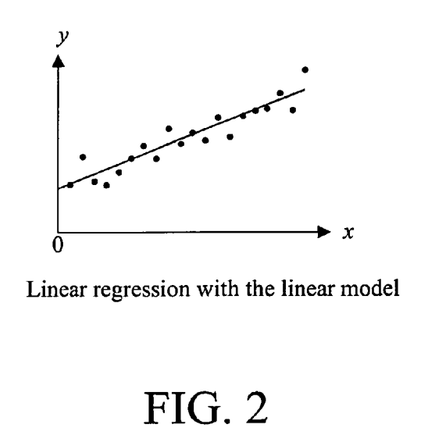
FIG. 2 illustrates linear regression.

Referring to FIG. 2, the regression analysis determines a regression model. The technique may start with a simple regression model, such as a linear regression model.

$$f(X) = wX + v$$

Then the task of regression analysis becomes to estimate m-by-n-dimensional w and m-by-1-dimensional v from the training samples $X_i$ and $Y_i$. Linear regression with linear model on a simple 1-D predictor space is illustrated in FIG. 2.

However, the training samples of image upscaling have demonstrated strong heterogeneousness, and the above linear regression model does not tend to sufficiently describe the relation between $X_i$ and $Y_i$. Therefore, the image up-scaling technique may use a nonlinear regression model, such as a segmented linear regression. It is to be understood that other nonlinear techniques, may likewise be used.

Figure 3:
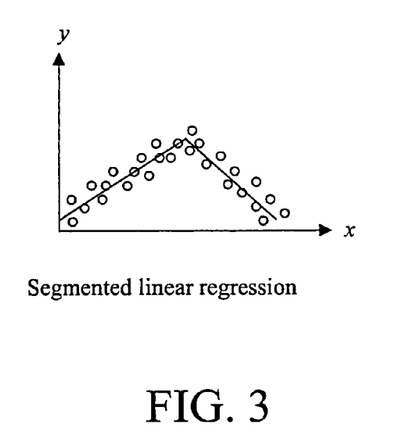
FIG. 3 illustrates segmented linear regression.

The segmented linear regression divides the predictor space $\Theta$ into many sub-spaces $\Theta_1, \Theta_2, \ldots \Theta_P$, and models each sub-space with the linear regression model. Mathematically, the segmented linear regression can be expressed as $$f(X) = \begin{cases} w_1 X + v_1 & \text{if } X \in \Theta_1 \\ w_2 X + v_2 & \text{if } X \in \Theta_2 \\ \vdots & \vdots \\ w_p X + v_p & \text{if } X \in \Theta_p \end{cases} \quad (2)$$

where $\Theta_1, \Theta_2, \ldots, \Theta_p$ are the sub-spaces, and $\Theta_1 + \Theta_2 + \ldots + \Theta_p$ is the predictor space. Segmented linear regression of a simple 1-D predictor space is illustrated in FIG. 3.

The segmented linear regression partitions the predictor space into sub-spaces, and each of them can be modeled by a linear regression model. Theoretically, there are countless possibilities of partition techniques, and some possibilities can have high computational costs and be trapping to a local minimum. One partition technique that can be used is a classification and regression tree (CART).

CART puts a restriction on the partition of the predictor space. Specifically, CART splits every (or a selected set of) predictor variable into segments by one or more breakpoint(s), and uses these segments of different predictor variables to form sub-spaces. If the high-dimensional predictor space is a big rectangle on a hyperplane, then CART cuts the big rectangle into many smaller rectangles along the orientation of the boundaries of the big rectangle.

Figure 4:
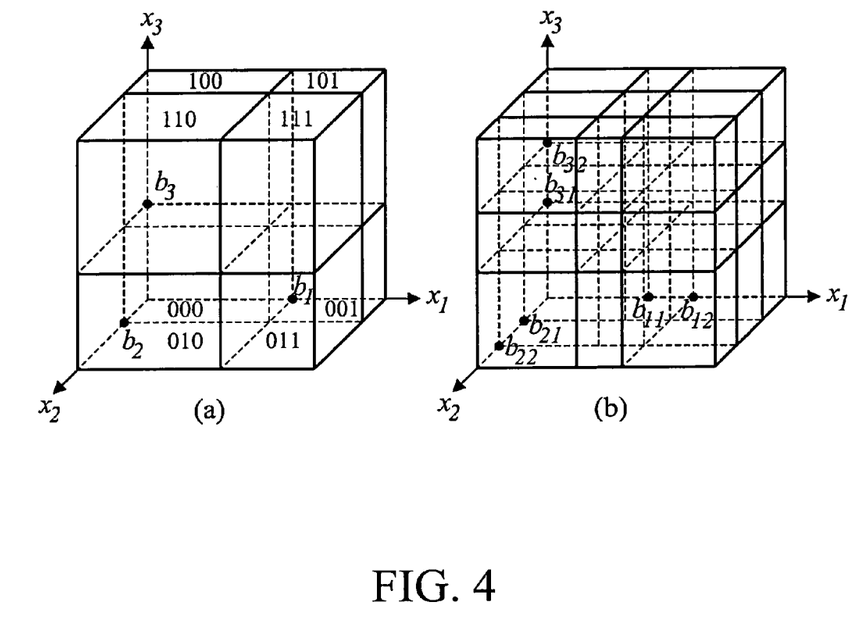
FIGS. 4(a)-4(b) illustrates breakpoints per predictor variable.

Assuming that each predictor variable $x_j$ has one breakpoint $b_j$, then a m-dimensional predictor space has total m breakpoints $B=[b_1, b_2, \ldots b_m]$. Totally there are $2^m$ sub-spaces, as illustrated in FIG. 4(a). FIG. 4(a) shows a 3-dimensional predictor variable space, and each predictor variable has one breakpoint. There are totally $2^3=8$ sub-spaces.

Each predictor variable can also define more than one breakpoint. FIG. 4(b) illustrates that every predictor variable has two breakpoints, and there are $3^3=27$ sub-spaces in the predictor space.

Figure 5:
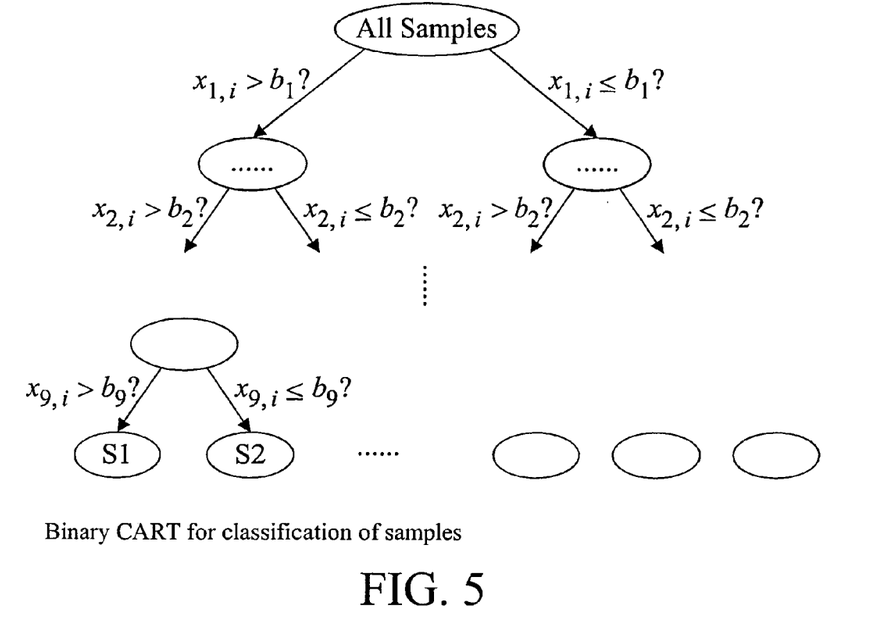
FIG. 5 illustrates binary CART.
Figure 6:
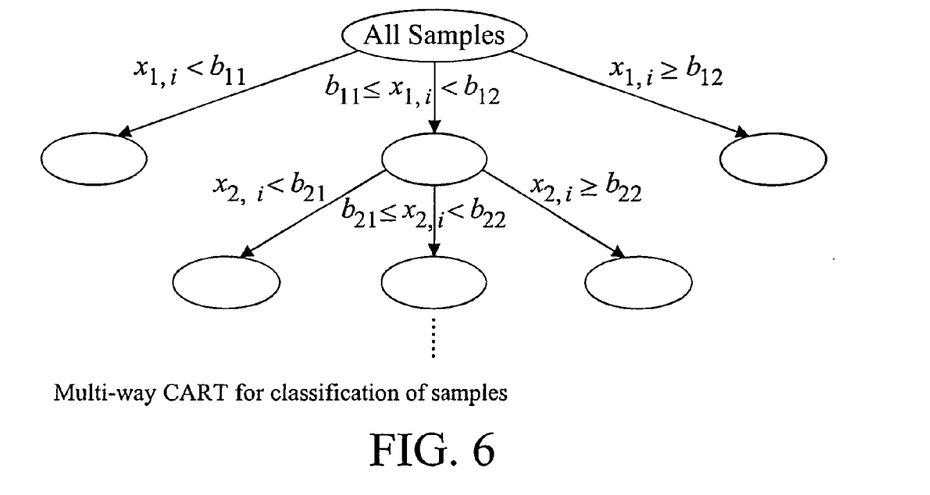
FIG. 6 illustrates multi-way CART.

Once the partition of predictor space is determined, classification of samples is putting samples into classes, where each class is defined by a sub-space. The strong restriction on the partition method of the predictor space greatly simplifies classification of a sample, and the classification can be well represented by a tree structure. Specifically, assuming that each predictor variable has one breakpoint, then the system has breakpoint vector $B=[b_1, b_2, \ldots b_m]$. For a sample $X_i = [x_{1,i} x_{2,i} \ldots x_{m,i}]^T$, the system compares its first response variable $x_{1,i}$ with the break point $b_1$ at the single root layer node, if it is less than $b_1$, the sample will be partitioned into the left child leaf, otherwise it will be classified to the right child leaf. Then the system compares $x_{2,i}$ with the breakpoint $b_2$ at the second layer nodes, and decide if the sample belongs to the left or right child leaf. The splitting procedure is repeated for all the response variables, until all m predictor variables have been processed. At the last level, there are $F=2^m$ leafs, and each leaf is a class that is corresponding to one sub-space. FIG. 5 illustrates the classification process for FIG. 3, and FIG. 6 classification process for FIG. 4.

A m-bit binary code is assigned to every sub-space/class, assuming that each predictor variable has one breakpoint. By comparing every predictor variable of a m-dimensional sample compares with its respective breakpoint, 0 is assigned if smaller and 1 if bigger, this sample is converted into an m-bit code. This code is the index of the sub-space/class that this sample belongs to. FIG. 4(a) illustrates the binary codes of the 8 sub-spaces. It is to be understood that other indexes and things can be used.

Because of the tree structure, this partition and classification method is called classification tree. A similar tree structure can be applied to regression as well, so jointly this partition technique is generally referred to as classification and regression tree (CART).

The technique for up-scaling may be based on segmented linear regression and CART, and is comprised of a training phase and a testing phase:

(1) Training phase (offline training): using the LR images and the corresponding HR images as training pairs, the training phase learns the breakpoints for CART to classify a LR window into one of the many classes, and the linear filter coefficients of each class.

(2) Interpolation phase (real-time interpolation): using the breakpoints and linear filter coefficients from the training phase, the interpolation phase generates new HR pixels.

Figure 7:
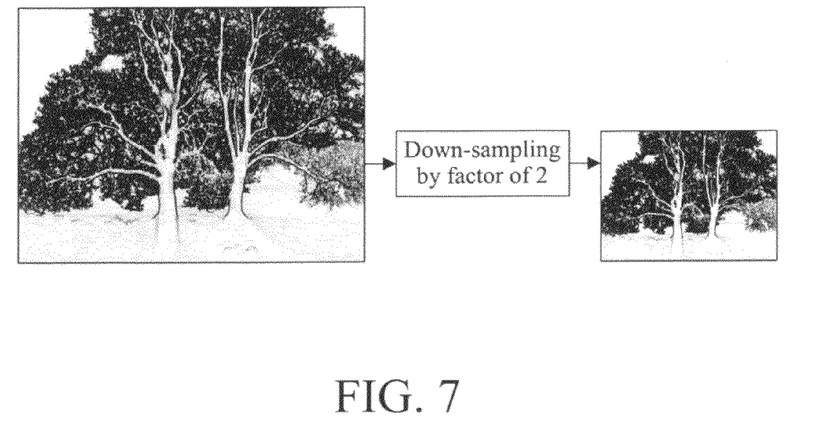
FIG. 7 illustrates HR and down sampled LR image.

Initially the training phase will be described. The training phase uses a number of LR-HR images pairs that have exactly (or substantially similar) the same contents but different resolutions as the training set. In order to make the LR-HR images have exactly (or substantially similar) same contents, the low resolution (LR) training images are obtained by down sampling the original high resolution (HR) images by factor of 2 (or other suitable factor), as illustrated by FIG. 7.

Figure 8:
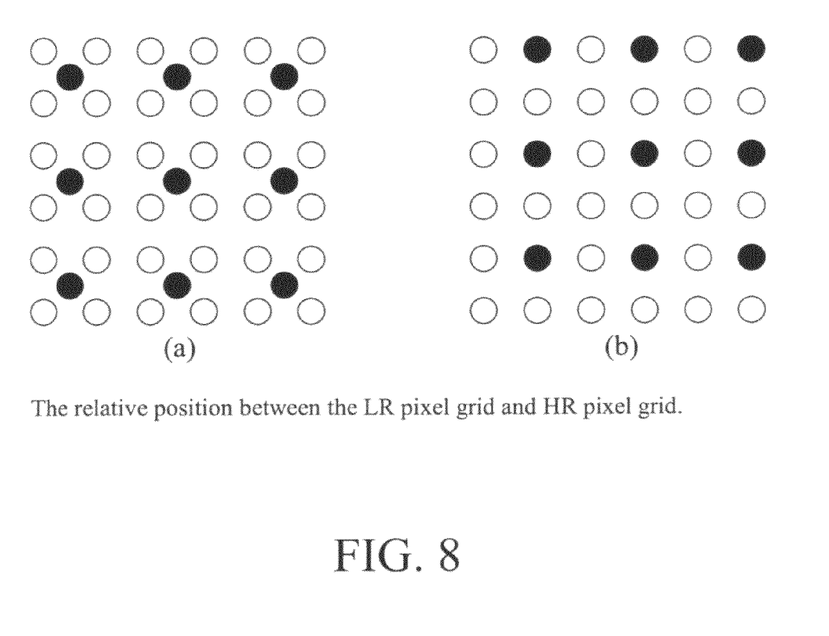
FIGS. 8(a)-8(b) illustrates relative positions between LR and HR pixel grids.

The down-sampling technique can make the LR pixel grid be either co-siting with the HR pixel grid, or half-HR-pixel off from the HR pixel grid, which is illustrated in FIGS. 8(*a*) and (*b*), respectively. Other grid or spatial relationships may likewise be used, as desired.

To obtain co-sited LR images, the system may first filter the original HR images with a 7-tap low-pass FIR filter, and then do 2× decimation by dropping the pixels at odd columns and rows. To obtain half-pixel-off LR images, the system may directly apply either simplest 4-point averaging, bi-linear down-sampling with half pixel shifting or bi-cubic down-sampling with half pixel shifting to the HR images.

The choice of the grid setting preferably impacts the choice of the HR window. During the training and interpolation phases, the LR window is sequentially centered at every pixel of an input LR image. The size of the LR window determines the computation cost and the size of the training set. Bigger the LR window is, heavier the computation cost is and bigger the training set is. One preferred embodiment of the LR window size is 3 by 3.

Figure 9:
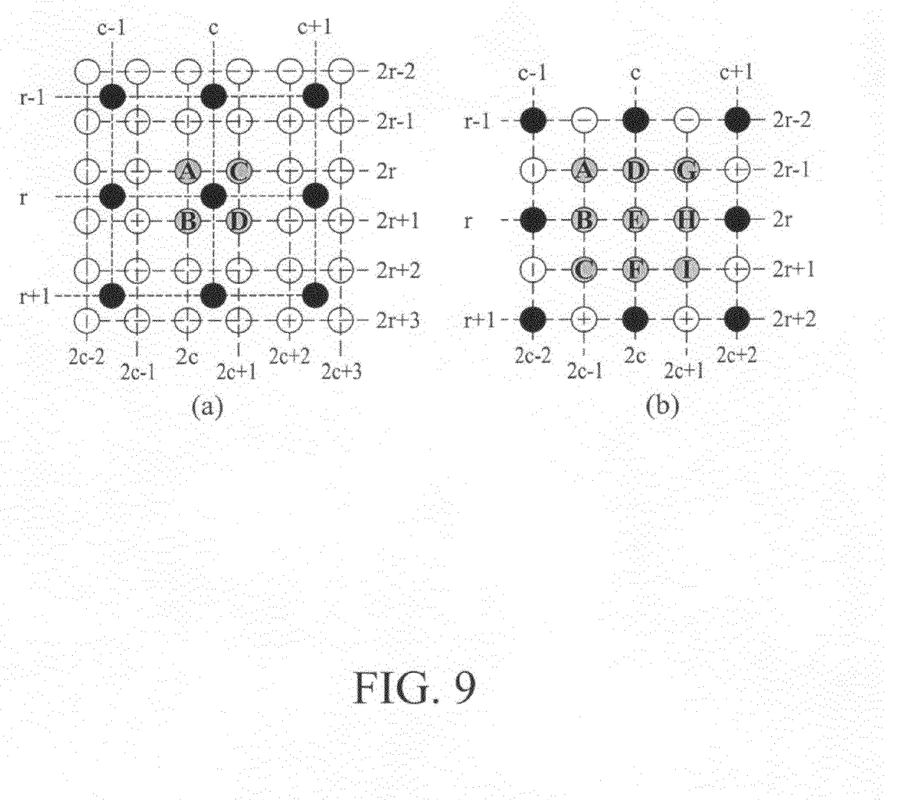
FIGS. 9(a)-9(b) illustrates LR and HR grids.

A HR window consists four or nine HR pixels interpolated from one LR window. The HR window of the half-pixel off grid setting consists of four HR pixels. As illustrated in FIG. 9(*a*), if the center of the LR window is at position of (c, r) in the LR image, the technique interpolates four pixels A, B, C, D, where A, B, C, and D are at position (2c, 2r), (2c+1, 2r), (2c, 2r+1), (2c+1, 2r+1), respectively.

The HR window of the co-sited grid setting consists of either four or nine HR pixels. As illustrated in FIG. 9(*b*), if the center of the LR window is at position of (c, r) in the LR image, there are the following five options:

(1) the technique interpolates four pixels A, B, D, E;

(2) the technique interpolates four pixels D, E, G, H;

(3) the technique interpolates four pixels B, C, E, F;

(4) the technique interpolates four pixels E, F, H, I;

(5) the technique interpolates nine pixels A, B, C, D, E, F, G, H, I.

where A is at (2c−1, 2r−1), B is at (2c−1, 2r), C is at (2c−1, 2r+1), D is at (2c, 2r−1), E is at (2c, 2r), F is at (2c, 2r+1), G is at (2c+1, 2r−1), H is at (2c+1, 2r), I is at (2c+1, 2r+1), respectively.

Options (1), (2), (3), and (4) have the four HR pixels un-symmetrically distributed in the LR window, and the HR windows are not overlapped. Option (5) has the nine HR pixels symmetrically distributed in the LR window, and is overlapped. HR pixels are generated multiple times from different LR windows in the interpolation phase. More specifically, pixels A, C, G, I are calculated four times, B, D, F, H two times, and E one time. The symmetry of HR pixels in a LR window assists in reducing the generation of undesirable artifacts.

The training images may be converted into monochrome images, such as by the following equation $$L = 0.299R + 0.587G + 0.114B$$

The system may likewise be extended to include color images, where the training phases and/or interpolation account for the colors of the images.

In the training phase, the image up-scaling technique may find the breakpoints $B = [b_1\ b_2\ \ldots\ b_m]$ and the parameters of $f(X)$ from $X_i$ and $Y_i$, where $f(X)$ is defined by $$f(X) = \begin{cases} w_1 X & \text{if } X \in \Theta_1 \\ w_2 X & \text{if } X \in \Theta_2 \\ \vdots & \vdots \\ w_p X & \text{if } X \in \Theta_p \end{cases} \quad (3)$$

where $w_i$ is a n by m weight vector. Because the LR and HR window have the same mean, equation (3) does not define the offset term $v_i$ that is defined in equation (2).

The training samples $X_i$ and $Y_i$ are all the M LR windows and their corresponding M HR windows in the training image set. For example, a 3×3 window is used in the LR images, so m=9 in $X_i$; a 2×2 window is used in the HR images, so n=4 in $Y_i$. A number of 20 LR-HR image pairs may be used as training data where the LR resolution is 100×100 and the HR resolution is 200×200, so M=20*100*100.

The preferred optimization criterion is to minimize E defined in equation (1):

$$B, w_1, w_2 \ldots w_P = \operatorname*{argmin}_{B, w_1, w_2 \ldots w_P} \left( \sum_{i=1}^{M} (f(X_i) - Y_i)^2 \right) \quad (4)$$

This optimization cannot be solved by simple taking derivative with respective to B and $w_i$. A traditional approach is an exhaustive search: examines all possible breakpoints, calculate all the possible linear regression models and E, and picks the set that gives smallest E. Obviously, the exhaustive search is possible but quite time-consuming.

Figure 10:
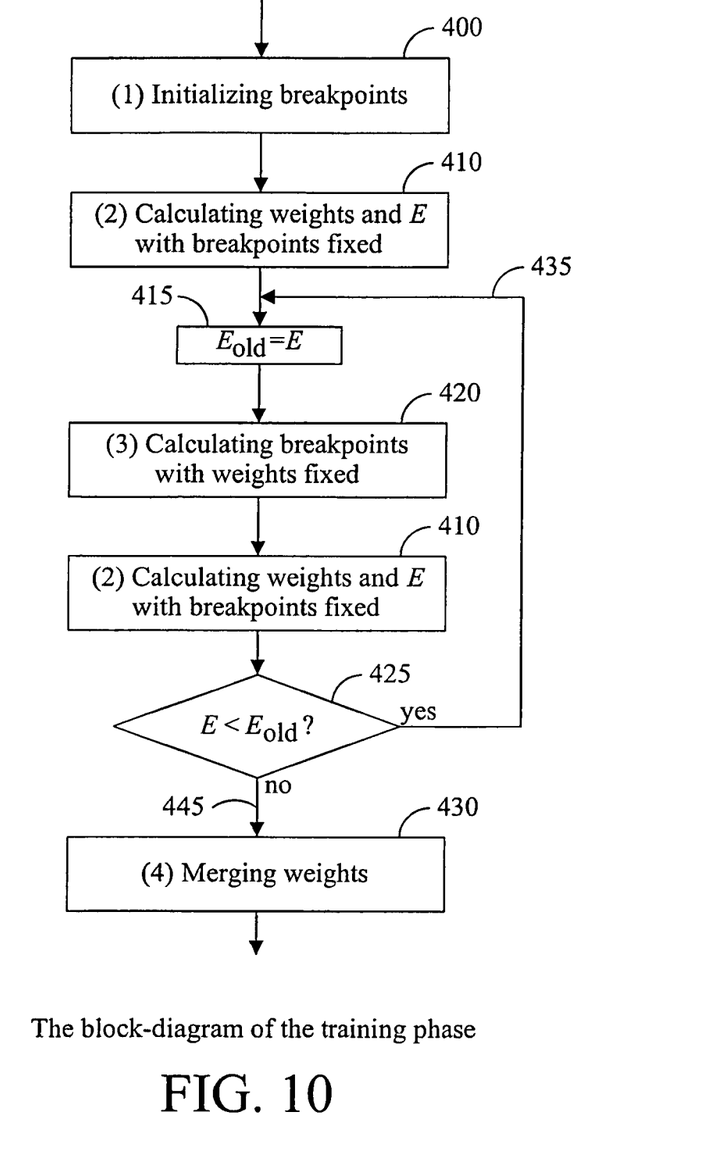
FIG. 10 illustrates the training phase.

An iterative approach may be used, as illustrated in FIG. 10, to perform the optimization. Specifically, the technique does not simultaneously optimize breakpoints and weights. Instead, the technique alternates between optimizing weights with breakpoints fixed and optimizing breakpoints with weights fixed to drive down E. The stopping condition of iteration is when E stops decreasing.

In summary, the training phase has four modules: (1) initializing breakpoints 400, (2) calculating the weights with the breakpoints fixed 410, (3) calculating the breakpoints with the weights fixed 420, and (4) merging weights 430.

Before iterations begin, the breakpoints $B = [b_1, b_2, \ldots b_m]^T$ are initialized 400. The initial breakpoints are the mean of all M $X'_i = [x'_{1,i}\ x'_{2,i} \ldots x'_{m,i}]^T$, $$b_j = \frac{1}{M} \sum_{i=1}^{M} x'_{j,i}$$

The normalization of $X_i$ is defined by $$x'_{j,i} = \frac{x_{j,i} - \min(X_i)}{\max(X_i) - \max(X_i)} \quad (5)$$

where $\min(X_i)$ is the minimal component in $X_i$, and max $(X_i)$ is the maximal component in $X_i$.

The normalization makes the new vector, $X'_i = [x'_{1,i}\ x'_{2,i} \ldots x'_{m,i}]^T$, which has the following characteristics:

$\max(X'_i) = 1$ $\min(X'_i) = 0$

Because all the components in $X'_i$ are between 0 and 1, $b_j$ is between 0 and 1.

Figure 11:
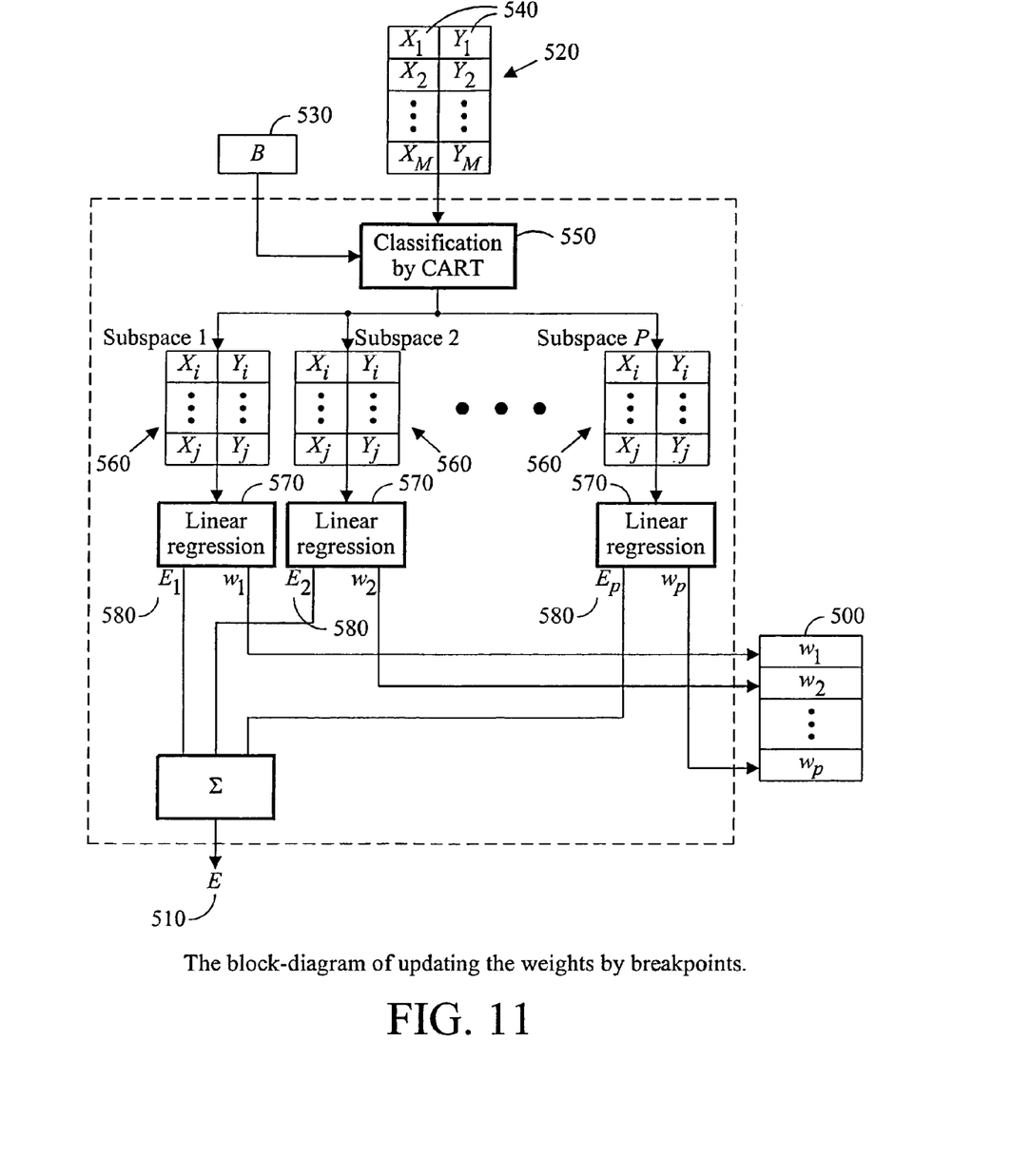
FIG. 11 illustrates updating the weights by breakpoints.

A breakpoint calculation module, illustrated by FIG. 11, calculates the weights $w_1 w_2 \ldots w_P$ 500 and E 510 while it keeps breakpoints B unchanged. The input of this module is the M training samples $X_i$-$Y_i$ 520 and breakpoints 530; the output is weights $w_1 w_2 \ldots w_P$ 500 and E 510.

First, every pair of $X_i$-$Y_i$ 540 is classified by CART 550 based on the breakpoints into one of the P sub-spaces 560. CART is not directly applied to the original sample $X_i$. Instead, it is applied to $X'_i$, normalized from $X_i$, which is discussed previously. The normalization takes out undesirable factors such as the offset term and amplitude.

Once all the M $X_i$-$Y_i$ has been classified into sub-spaces 560, the system uses linear regression 570 with a linear model to calculate $w_1 w_2 \ldots w_P$. The mathematical equations are $$w_1 = \underset{w_1}{\operatorname{argmin}} \sum_{X_i \in \Theta_1} (w_1 X_i - Y_i)^2$$

$$w_2 = \underset{w_2}{\operatorname{argmin}} \sum_{X_i \in \Theta_2} (w_2 X_i - Y_i)^2$$

$$\vdots$$

$$w_P = \underset{w_P}{\operatorname{argmin}} \sum_{X_i \in \Theta_P} (w_P X_i - Y_i)^2$$

Weights $w_1 w_2 \ldots w_P$ minimize the prediction error 580 of respective class. The prediction error 580 of each class is $$E_1 = \sum_{X_i \in \Theta_1} (w_1 X_i - Y_i)^2$$

$$E_2 = \sum_{X_i \in \Theta_2} (w_2 X_i - Y_i)^2$$

$$\vdots$$

$$E_P = \sum_{X_i \in \Theta_P} (w_P X_i - Y_i)^2$$

Then the total E 510 is $$E = E_1 + E_2 + \ldots E_P$$

Figure 12:
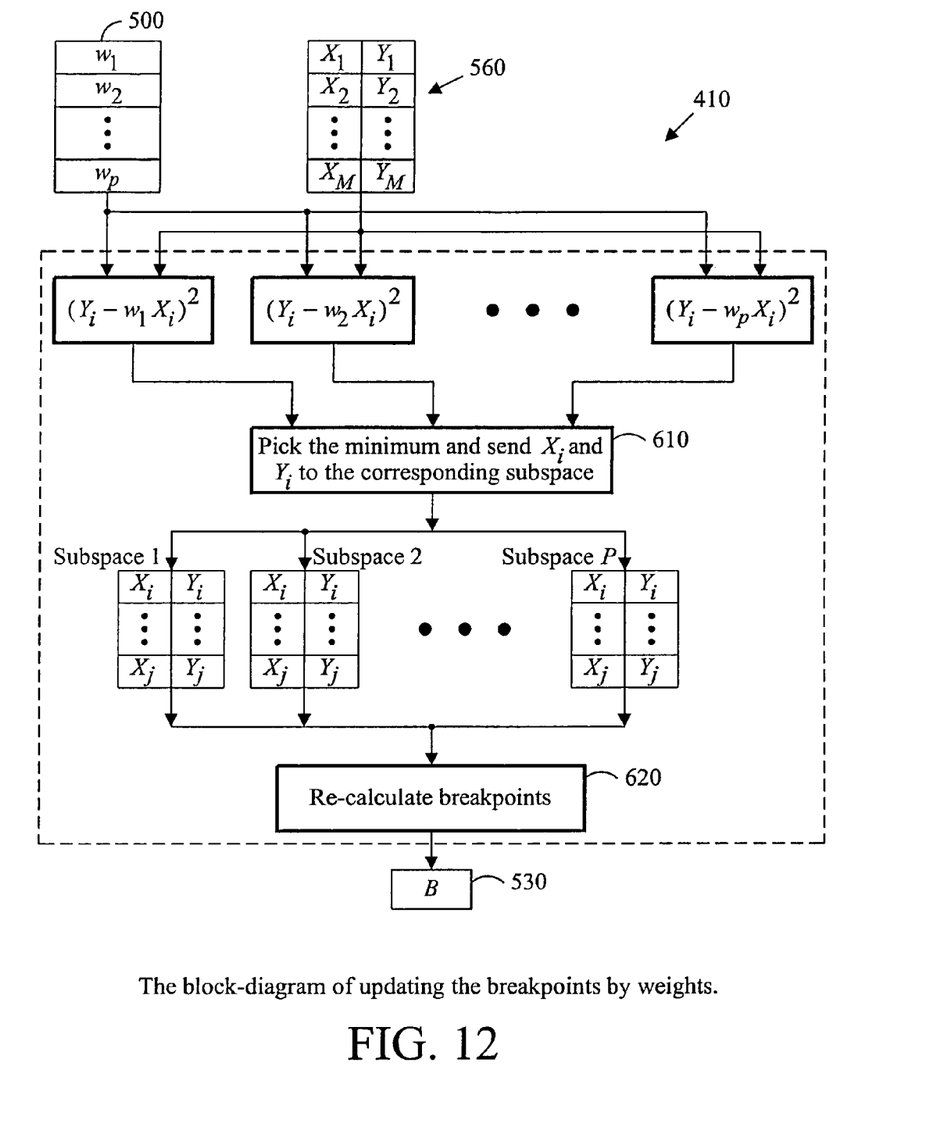
FIG. 12 illustrates updating the breakpoints by weights.

Referring again to FIG. 10, the process initializes the breakpoints 400 then calculates the weights and E 410 based upon the initialized breakpoints, as illustrated in FIG. 11. Then system then calculates breakpoints with the weights fixed 420, as illustrated in FIG. 12. FIG. 12, calculates the breakpoints B 530 while keeping the weights $w_1 w_2 \ldots w_P$ 500 unchanged. The input of this module is the M 520 training samples $X_i$-$Y_i$ 520 and $w_1 w_2 \ldots w_P$ 500 while the output is B 530.

This module also classifies training samples first. However, the classification is not based on CART and breakpoints. Instead, it uses the weights $w_1 w_2 \ldots w_P$ 500 to do the classification. More specifically, the sub-space/class that $X_i$-$Y_i$ pair 560 belongs to is the weight set that gives the minimal predictor error among all P sets of weights 610:

$$\operatorname{index}(X_i) = \underset{j}{\operatorname{argmin}}(w_j X_i - Y_i)^2, \; j \in \{1, 2, \ldots P\}$$

In other words, the module 410 tries all the P sets of weights on $X_i$ to predict $Y_i$, to find the set of weights that give the minimal prediction error, and put $X_i$-$Y_i$ into the corresponding sub-space/class.

After all the M samples are classified into subspaces by the above technique, the module 410 derives the new break points 620. In the case of binary CART, half of the $2^m$ sub-spaces whose $x_i$ are bigger than $b_i$, and the i-th bit in the indexes of these sub-spaces is 1; half of the sub-paces whose $x_i$ are smaller than $b_i$, and the i-th bit in their indexes is 0. For example, if the predictor space is 3 dimensional (FIG. 3), then there are 8 sub-spaces. The sub-spaces with indexes 010, 011, 110, and 111 have their $x_2$ bigger than $b_2$, and the sub-spaces with indexes 000, 001, 100, and 101 have their $x_2$ smaller than $b_2$.

To determine $b_i$, the system first collects samples that belong to the $2^{m-1}$ sub-paces whose $x_i$ are bigger than $b_i$ into $A_i$, and samples that belong to the $2^{m-1}$ sub-paces whose $x_i$ are smaller than $b_i$ into $B_i$. Then the system does:

$$b_1 = (\operatorname{mean}(A_1) + \operatorname{mean}(B_1))/2$$

$$b_2 = (\operatorname{mean}(A_2) + \operatorname{mean}(B_2))/2$$

$$\vdots$$

$$b_m = (\operatorname{mean}(A_m) + \operatorname{mean}(B_m))/2$$

Figure 13:
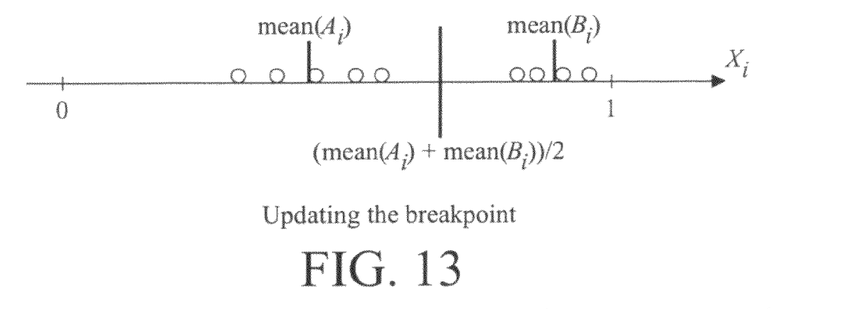
FIG. 13 illustrates updating the breakpoint.

The above procedure is illustrated graphically in FIG. 13.

Referring again to FIG. 10, the technique include calculating breakpoints 420 and calculating weights and E 410. Before calculating new breakpoints 420 and weights and E 410, the current value of E is maintained as $E_{old}$ 415. After calculating new breakpoints 420 and weights and E 410, the modified value of E is compared against the maintained value of $E_{old}$ at block 425 to determine if the error has decreased. If the error has decreased, then the process is repeated 435. If the error has not decreased, then the iteration process is ended 445 and the weights are merged at block 430.

A weight reduction module 430 may be used. The input is the trained weights $w_1 w_2 \ldots w_P$, where $w_j$ is n by m. The output is a vector table with the size of L by m, where L is much smaller than Pn, and an index lookup table that will be used by the interpolation phase to map the vector table back to $w_1 w_2 \ldots w_P$.

The reduction is based on the fact that there is strong redundancy among weights across different sub-spaces. More specifically, many sub-spaces can merge their weights into one set without sacrificing the performance.

The reduction is done by using the k-means clustering technique clustering on $w_1, w_2, \ldots w_P$, where $P = 2^m$. Weight vector $w_j$ of class i can be viewed as a n by m matrix, where m is the pixel number in the LR window and n is the pixel number in the HR window. Assuming that n=4 (2×2 HR window), and m=9 (3×3 LR window), all the 512 weight vectors are $$w_1 w_2 \ldots w_{512} = \begin{bmatrix} w_{11} \\ w_{12} \\ w_{13} \\ w_{14} \end{bmatrix} \begin{bmatrix} w_{21} \\ w_{22} \\ w_{23} \\ w_{24} \end{bmatrix} \ldots \begin{bmatrix} w_{5121} \\ w_{5122} \\ w_{5123} \\ w_{5124} \end{bmatrix}$$

Each of the components, $w_{s,t}$ ($1 \le s \le 512$, $1 \le t \le 4$) in the above matrices is a 1 by 9 vector, and is responsible for generating HD pixel with index t for class s. The system re-organizes these weight vectors into 4 groups:

$$\begin{bmatrix} w_{11} \\ w_{21} \\ \vdots \\ w_{5121} \end{bmatrix} \begin{bmatrix} w_{12} \\ w_{22} \\ \vdots \\ w_{5122} \end{bmatrix} \begin{bmatrix} w_{13} \\ w_{23} \\ \vdots \\ w_{5123} \end{bmatrix} \begin{bmatrix} w_{14} \\ w_{24} \\ \vdots \\ w_{5124} \end{bmatrix}$$

A column is the weight vectors across all the classes to generate one of the four HD pixels. The system applies k-means clustering to each group independently.

The k-mean clustering will cluster the number of weight vectors into certain number of centroids. In the above case, the clustering target could be 128 centroids. The centroids and the table that maps from the weight vectors to the group are the results. In the prediction phase, these centroids and the table are used to recover the full-size weight vectors.

Figure 14:
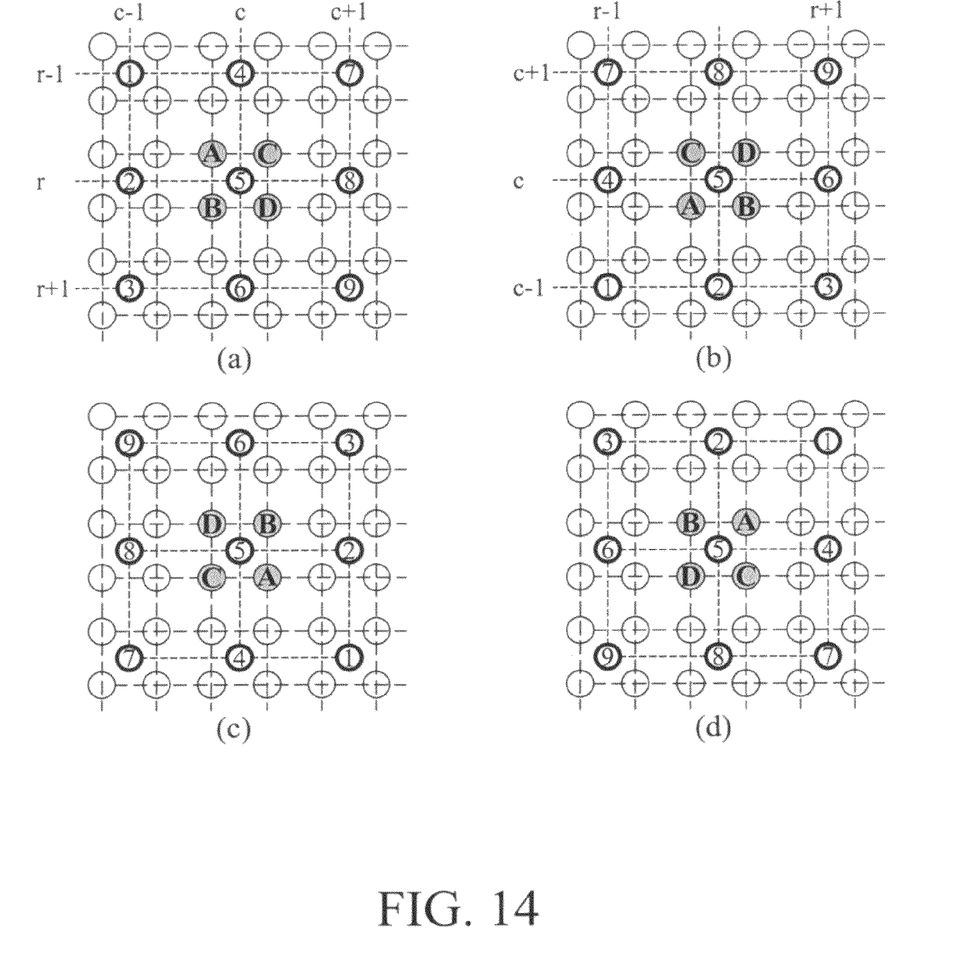
FIGS. 14(a)-14(d) illustrates LR windows and its generated HR pixels.

When the HD pixels interpolated from a LR window are symmetrically distributed in the LR window, the system can further reduce the size by exploiting the redundancy among the symmetric positions. For example, FIG. 14 shows the case that the LR window is 3×3, and the HR window is 2×2. The HD pixels generated from the LR window are symmetric around the center pixel. When the system rotates the LR-HR window anti-clockwisely by 90, 180 and 270 degrees, pixels C, D, and B are at the position of pixel A, respectively, as illustrated by FIG. 14(b-d). The rotation of the LR-HR window is equal to re-ordering the components in the weight vectors. Specifically, if the system represents a weight vector $w_{ij} = [v_1\ v_2\ v_3\ v_4\ v_5\ v_6\ v_7\ v_8\ v_9]$ For pixel B, the system rotates 90 degree, and the re-ordered weight vector is: $w_{i2}^{90} = [v_7\ v_4\ v_1\ v_8\ v_5\ v_2\ v_9\ v_6\ v_3]$ For pixel C, the system rotates 180 degree, and the re-ordered weight vector is: $w_{i3}^{180} = [v_9\ v_8\ v_7\ v_6\ v_5\ v_4\ v_3\ v_2\ v_1]$ For pixel D, the system rotates 270 degree, and the re-ordered weight vector is: $w_{i4}^{270} = [v_3\ v_6\ v_9\ v_2\ v_5\ v_8\ v_1\ v_4\ v_7]$ Then after re-ordering, the system concatenates these weight vectors into one group, and apply k-means clustering to this group. In the interpolation phase, the technique may revise this re-ordering.

Figure 15:
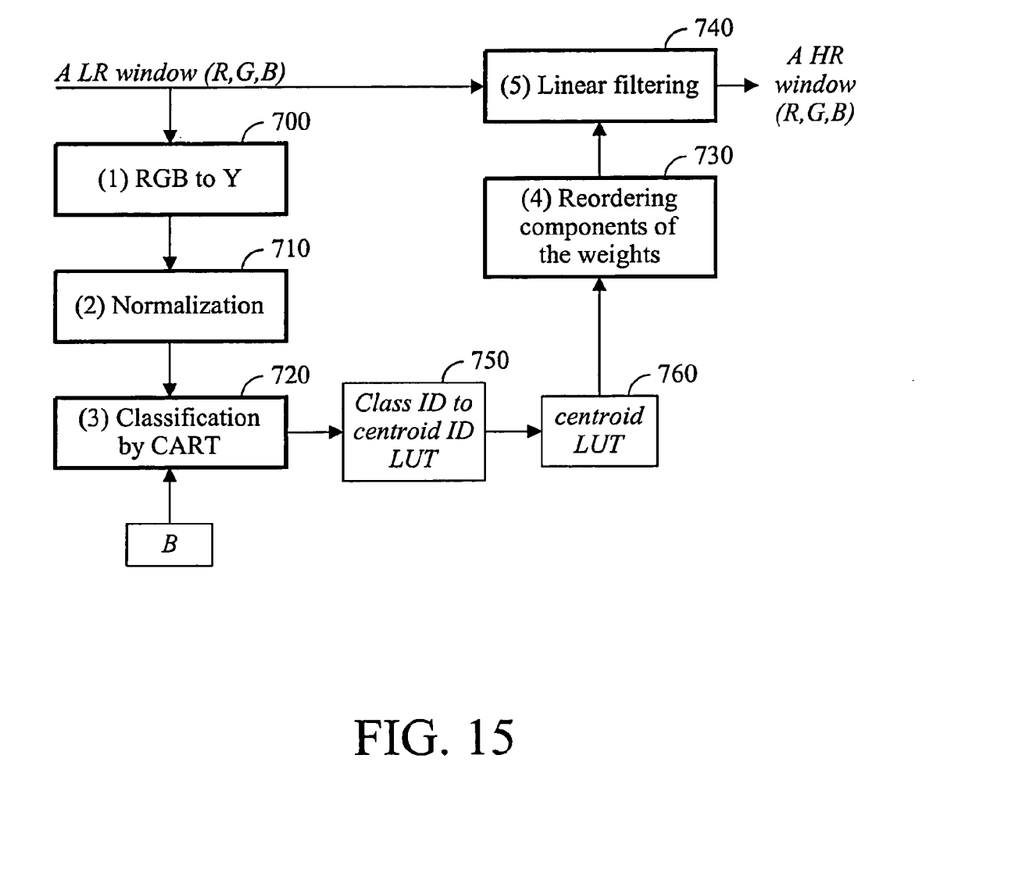
FIG. 15 illustrates generating a HR window from a LR window in the interpolate phase.

FIG. 15 shows a block-diagram of generating a HR window from a LR window in the interpolation phase, which includes the following five modules:

(1) RGB to L 700

If the input LR image is a color image with red, green and blue sub-pixels, the technique convert to luminance by the following equation $$L = 0.299R + 0.587G + 0.114B$$

(2) Normalization 710

The normalization module normalizes the luminance of the pixels in the input LR window into range [0 1] that is defined by equation (5).

(3) Classification by CART 720

Classification by CART uses the breakpoints B obtained in the training phase. The class ID from the classification refers to the "class ID to centroid ID" LUT 750 to get the proper centroid ID, and the centroid ID leads to the centroids stored in the LUT 760.

(4) Reordering components of the weights 730

Some weights are re-ordered before k-means clustering in the training phase. The centroids are needed to be revisely re-ordered to get the proper weight vectors $w_j$.

(5) Linear filtering 740

The technique applies $w_j$ to the RGB channels separately to generate the interpolated RGB HR pixels.

If the HR window contains 9 pixels, then some HR pixels are generated multiple times by different windows. The technique uses averaging to get the final results.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

The invention claimed is:

1. A method for scaling an image comprising:
   (a) generating a low-resolution data set from a high-resolution data set;
   (b) generating a set of filters based upon said low-resolution data set and said high-resolution data set suitable for up-scaling a low resolution image to a high resolution image;
   (c) wherein said filters are determined using a weighting factor, an error factor, and a breakpoint of a Classification and Regressive Tree (CART) technique, and using an iterative technique that iteratively adjusts said weight factor and said breakpoint factor among successive iterations, where said breakpoint splits at least one predictor variable into segments, and wherein said iterative technique alternates between adjusting said weight factor while holding said breakpoint factor fixed, and adjusting said breakpoint factor holding said weight factor fixed, and stopping when said error factor diminishes between successive iterations by an amount less than a threshold;
   (d) receiving a low-resolution image and generating a corresponding high-resolution image based upon said filters.

2. The method of claim 1 wherein said CART technique is non-linear.

* * * * *